US012516008B2

(12) United States Patent
Leal et al.

(10) Patent No.: US 12,516,008 B2
(45) Date of Patent: Jan. 6, 2026

(54) SYSTEMS AND METHODS FOR MTBE PRODUCTION

(71) Applicant: SABIC Global Technologies B.V., Bergen op Zoom (NL)

(72) Inventors: Guillermo Leal, Riyadh (SA); Mohammed B. Ansari, Riyadh (SA); Vijay Dinkar Bodas, Riyadh (SA); Umesh Hasyagar, Bangalore (IN); Vinod Nair, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 850 days.

(21) Appl. No.: 17/783,841

(22) PCT Filed: Dec. 10, 2020

(86) PCT No.: PCT/IB2020/061774
§ 371 (c)(1),
(2) Date: Jun. 9, 2022

(87) PCT Pub. No.: WO2021/116980
PCT Pub. Date: Jun. 17, 2021

(65) Prior Publication Data
US 2022/0371978 A1    Nov. 24, 2022

(30) Foreign Application Priority Data

Dec. 11, 2019 (EP) ..................................... 19215357

(51) Int. Cl.
*C07C 41/06* (2006.01)
*B01J 31/10* (2006.01)
*C07C 41/42* (2006.01)

(52) U.S. Cl.
CPC ............... *C07C 41/06* (2013.01); *B01J 31/10* (2013.01); *C07C 41/42* (2013.01); *B01J 2231/321* (2013.01); *B01J 2531/002* (2013.01)

(58) Field of Classification Search
CPC .......... C07C 41/06; C07C 41/42; B01J 31/10; B01J 2231/321; B01J 2531/002
See application file for complete search history.

(56) References Cited

U.S. PATENT DOCUMENTS

| 4,310,710 | A | 1/1982 | Torck et al. |
|---|---|---|---|
| 4,324,924 | A | 4/1982 | Torck et al. |

(Continued)

FOREIGN PATENT DOCUMENTS

| CN | 104903277 A | 9/2015 |
|---|---|---|
| CN | 105873887 A | 8/2016 |

(Continued)

OTHER PUBLICATIONS

Badia, J. H. et al., "Catalytic activity and accessibility of acidic ion-exchange resins in liquid phase etherification reactions," Top. Catal., 2015. vol. 58, pp. 919-932.

(Continued)

*Primary Examiner* — Medhanit W Bahta
(74) *Attorney, Agent, or Firm* — Norton Rose Fulbright US LLP (57) ABSTRACT

Systems and methods for producing MTBE are disclosed. A $C_4$ feed stream containing isobutylene and other $C_4$ hydrocarbons is fed into a reactor unit for producing MTBE. The effluent of the reactor unit comprising MTBE is further processed to produce a MTBE product stream that comprises at least 90 wt. % MTBE. At least a portion of the MTBE product stream is then recycled back to the reactor unit.

19 Claims, 4 Drawing Sheets

(56) References Cited

U.S. PATENT DOCUMENTS 4,404,409 A   9/1983  Fujiwara et al.
5,811,597 A   9/1998  Hwan et al.

FOREIGN PATENT DOCUMENTS

| CN | 108834410 A | 11/2018 |
|---|---|---|
| EP | 0502265 A2 | 9/1992 |
| EP | 0714878 B1 | 1/2007 |
| WO | WO2018203179 A1 | 11/2018 |

OTHER PUBLICATIONS

Berg, D. A. et al., "Characterization of Multicomponent Diffusion Effects in MTBE Synthesis," Ind. Eng. Chem. Res., 1993, vol. 32, pp. 2147-2158.
Extended European Search Report from EP 19215357.5 dated Jun. 16, 2020, 9 pages.
International Search Report and Written Opinion from PCT/IB2020/061774 dated Mar. 3, 2021, 11 pages.
Winterberg et al., "Methyl Tert-Butyl Ether." Ullmann's Encyclopedia of Industrial Chemistry. vol. 23, 2012, pp. 119-130.

SYSTEMS AND METHODS FOR MTBE PRODUCTION

CROSS REFERENCE TO RELATED APPLICATIONS

This application is a national phase application under 35 U.S.C. § 371 of International Application No. PCT/IB2020/061774 filed Dec. 10, 2020, which claims priority to European Patent Application No. 19215357.5 filed Dec. 11, 2019. The entire contents of each of the above-referenced disclosures is specifically incorporated by reference herein without disclaimer.

FIELD OF INVENTION

The present invention generally relates to systems and methods for producing MTBE (methyl tertiary-butyl ether). More specifically, the present invention relates to systems and methods for producing MTBE that include recycling a portion of an MTBE product stream to an MTBE synthesis reactor unit.

BACKGROUND OF THE INVENTION

MTBE is an organic compound that is used as an additive in gasoline to enhance the octane number of the gasoline. Since about 1970, MTBE has been synthesized by etherification of isobutylene by reaction with methanol in the presence of an acidic catalyst. Isobutylene used for MTBE synthesis can be obtained from a $C_4$ product stream generated as a by-product in cracking of naphtha to produce light olefins. Generally, isobutylene and methanol are fed into a fixed bed reactor to produce an MTBE containing effluent. The effluent is then fed to a reaction column to react isobutylene remaining in the effluent with additional methanol to produce more MTBE.

A portion of the effluent stream from the reaction column, which can include non-reactive $C_4$ hydrocarbons from the feed stream as well as MTBE, are recycled back to the fixed bed reactor. The non-reactive $C_4$ hydrocarbons can be a large portion of the feedstock flowed into the MTBE synthesis unit, resulting in the requirement of large reactor volume for the MTBE synthesis reactor and a large flow rate for the recycle stream. Furthermore, as the process of MTBE synthesis is highly exothermic, the reactor(s) with large reactor volume(s) and large recycle stream(s) have to be consistently cooled, resulting in high utility consumption (in the form of cooling water).

Overall, while the methods of producing MTBE by etherification of isobutylene by reaction with methanol exist, the need for improvements in this field persists in light of at least the aforementioned drawbacks for the conventional methods.

BRIEF SUMMARY OF THE INVENTION

A solution to at least some of the above mentioned problems associated with methods of producing MTBE has been discovered. The solution resides in a method of producing MTBE that includes recycling a portion of a produced MTBE stream to the MTBE synthesis reactor. Notably, the method includes separating non-reactive $C_4$ hydrocarbons from the recycle stream, thereby allowing for the use of smaller MTBE synthesis reactor(s) than would be possible using conventional methods. Furthermore, the reduction of overall reactor volume and recycle volume can lead to reduced utility consumption because MTBE synthesis reactor cooling can be carried out more efficiently. Moreover, the recycle stream of the discovered method is capable of increasing the production efficiency for MTBE because higher MTBE concentration in the MTBE synthesis reactor(s) increases (i) the affinity of the resin based catalyst for isobutylene and methanol and (ii) the diffusivity of the reaction mixture in the resin based catalyst. Therefore, the method of the present invention provides a technical solution to at least some of the problems associated with the conventional methods for producing MTBE.

Embodiments of the invention include a method of producing methyl tertiary butyl ether (MTBE). The method comprises reacting isobutylene and methanol in a reactor unit to form a reactor unit effluent comprising MTBE. The method comprises processing the reactor unit effluent to form an MTBE product stream comprising at least 90 wt. % MTBE. The method comprises recycling at least a portion of the MTBE product stream to the reactor unit. In embodiments of the invention, the MTBE product stream includes more than 98 wt. % MTBE. The MTBE product stream may be at a temperature of 40 to 45° C.

Embodiments of the invention include a method of producing methyl tertiary butyl ether (MTBE). The method includes reacting isobutylene and methanol in a reactor unit to form a reactor unit effluent comprising MTBE. The method may include removing water from the reactor unit effluent to form dried reactor unit effluent. The method further includes distilling the dried reactor unit effluent in a distillation column to produce a first bottom stream comprising MTBE and a stream comprising primarily methanol 1-butene, 2-butene, n-butane, and isobutane, collectively. The method further still includes distilling at least some of the first bottom stream to produce an MTBE product stream comprising at least 90 wt. % MTBE. The method further includes recycling at least a portion of the MTBE product stream to the reactor unit.

Embodiments of the invention include a method of producing MTBE. The method includes feeding isobutylene and methanol to a first adiabatic fixed bed reactor and a second adiabatic fixed bed reactor, arranged in parallel. The method includes subjecting the isobutylene and the methanol, in the first adiabatic fixed bed reactor and the second adiabatic fixed bed reactor, respectively, to reaction conditions sufficient to cause the isobutylene to react with the methanol to produce a first portion of MTBE in effluent from the first adiabatic fixed bed reactor and in effluent from the second adiabatic fixed bed reactor. The method includes combining effluent from the first adiabatic fixed bed reactor and effluent from the second adiabatic fixed bed reactor to form a reactor unit effluent. The reactor unit effluent further comprises isobutylene. The method further includes removing water from the reactor unit effluent in a flash drum to form a dried reactor unit effluent. The method further includes reacting isobutylene comprised in a first portion of the dried reactor unit effluent with methanol in a third adiabatic fixed bed reactor that is in series with the first adiabatic fixed bed reactor and the second adiabatic fixed bed reactor, to produce a third adiabatic fixed bed reactor effluent stream comprising a second portion of MTBE. The method includes mixing a second portion of the dried reactor unit effluent with the third adiabatic fixed bed reactor effluent stream to form a mixed feed stream for a first distillation column. The method includes distilling the mixed feed stream in the first distillation column to produce a first bottom stream comprising primarily MTBE and a stream comprising primarily methanol, 1-butene, 2-butene, n-butane, and isobutane, collectively. The method includes distilling at least some of the first bottom stream, in a second distillation column, to produce an MTBE product stream comprising at least 90 wt. % MTBE. The method further includes recycling at least a portion of the MTBE product stream to the first adiabatic fixed bed reactor and the second adiabatic fixed bed reactor.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

In the context of the present invention, at least fifteen embodiments are now described. Embodiment 1 is a method of producing methyl tertiary butyl ether (MTBE). The method includes the steps of reacting isobutylene and methanol in a reactor unit to form a reactor unit effluent containing MTBE; processing the reactor unit effluent to form an MTBE product stream containing at least 90 wt. % MTBE; and recycling at least a portion of the MTBE product stream to the reactor unit. Embodiment 2 is the method of embodiment 1, wherein the recycling of at least a portion of MTBE product stream is capable of improving cooling efficiency in the reactor unit. Embodiment 3 is the method of any of embodiments 1 and 2, wherein the reactor unit includes a resin based catalyst, wherein the recycling of the at least a portion of MTBE product stream is capable of improving diffusivity of isobutylene and methanol in the resin based catalyst. Embodiment 4 is the method of embodiment 3, wherein the recycling of at least a portion of MTBE product stream is capable of improving access to active sites of the resin based catalyst for isobutylene and methanol. Embodiment 5 is the method of any of embodiments 3 and 4, wherein the resin based catalyst includes a polystyrene based resin, a polystyrene divinyl benzene based resin, a sulfonic resin, macroreticular resin, an acidic ion-exchange resin, a sulphonated macroporous resin, or combinations thereof. Embodiment 6 is the method of any of embodiments 1 to 5, wherein the processing includes removing water from the reactor unit effluent to form dried reactor unit effluent; distilling at least a portion of the dried reactor unit effluent in a first distillation column to produce a first bottom stream containing MTBE and a first top stream containing primarily methanol 1-butene, 2-butene, n-butane, and isobutane, collectively; and distilling at least some of the first bottom stream in a second distillation column to produce an MTBE product stream containing at least 90 wt. % MTBE. Embodiment 7 is the method of embodiment 6, wherein the first top stream further includes less than 0.5 wt. % unreacted isobutylene. Embodiment 8 is the method of any of embodiments 6 and 7, further including processing the first top stream in a methanol washing column to recover at least some methanol. Embodiment 9 is the method of any of embodiments 6 to 8, wherein the second distillation column is a reactive distillation column. Embodiment 10 is the method of any of embodiments 6 to 9, wherein the reactor unit includes a first adiabatic fixed bed reactor and a second adiabatic fixed bed reactor. Embodiment 11 is the method of embodiment 10, wherein the first adiabatic fixed bed reactor and the second adiabatic fixed bed reactor are arranged in parallel. Embodiment 12 is the method of any of embodiments 10 and 11, wherein the reacting step includes feeding isobutylene and methanol to the first adiabatic fixed bed reactor and the second adiabatic fixed bed reactor; and subjecting the isobutylene and the methanol, in the first adiabatic fixed bed reactor and the second adiabatic fixed bed reactor, respectively, to reaction conditions sufficient to cause the isobutylene to react with the methanol to produce a first portion of MTBE in a reactor unit effluent. Embodiment 13 is the method of any of embodiments 11 to 12, wherein the reactor unit effluent includes an effluent stream from first adiabatic fixed bed reactor and an effluent stream from the second adiabatic fixed bed reactor, and wherein the reactor unit effluent further includes isobutylene. Embodiment 14 is the method of embodiment 13, wherein the processing step further includes reacting isobutylene contained in a first portion of the dried reactor unit effluent with methanol in a third adiabatic fixed bed reactor that is in series with the first adiabatic fixed bed reactor and the second adiabatic fixed bed reactor, to produce a third adiabatic fixed bed reactor effluent stream includes a second portion of MTBE; mixing a second portion of the dried reactor unit effluent with the third adiabatic fixed bed reactor effluent stream to form a mixed feed stream for a first distillation column; distilling the mixed feed stream in the first distillation column to produce a first bottom stream containing primarily MTBE and a first top stream containing primarily methanol, 1-butene, 2-butene, n-butane, and isobutane, collectively; and distilling at least some of the first bottom stream, in a second distillation column, to produce an MTBE product stream containing at least 90 wt. % MTBE. Embodiment 15 is the method of embodiment 14, further including recycling a third portion of the reactor unit effluent to the first adiabatic fixed bed reactor and/or the second adiabatic fixed bed reactor.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which:

FIGS. 1A and 1B show schematic diagrams for a system for producing MTBE, according to embodiments of the invention.

FIGS. 3A and 3B show experimental results of producing MTBE with and without recycling MTBE to the initial feed stream.

DETAILED DESCRIPTION OF THE INVENTION

Currently, conventional methods of producing MTBE suffer several drawbacks that limit the production efficiency of MTBE. For the conventional methods, the non-reactive $C_4$ hydrocarbons, including n-butane, isobutane, 1-butene, and 2-butene, are mixed with MTBE and the mixed stream is recycled back to the MTBE synthesis reactor(s). Therefore, to achieve a given MTBE production level, the conventional methods require MTBE synthesis reactors to have a large feed flow rate and a large recycle stream flowrate, resulting in high production costs and capital expenditure for producing MTBE. Furthermore, the non-reactive $C_4$ hydrocarbons dilute the reactants including isobutylene and methanol in the MTBE synthesis reactor, resulting in low reaction rate for MTBE synthesis reaction. Moreover, the non-reactive $C_4$ hydrocarbons in the MTBE synthesis unit also increase the utility (e.g., cooling water) and/or energy consumption for cooling the reactor(s). Additionally, the conventional methods of producing MTBE suffer catalyst sintering in the MTBE synthesis reactor(s) when isobutene conversion rate is above 60%. Therefore, the conversion ratio of isobutene in the MTBE synthesis reactor(s) needs to be controlled under 60%. The present invention provides a solution to at least some of these problems. The solution is premised on a method of producing MTBE that includes recycling at least a portion of a MTBE product stream without non-reactive $C_4$ hydrocarbons to MTBE synthesis reactor(s). This can be beneficial for reducing the required feed stream flowrate and/or reactor volume and utility and/or energy consumption for cooling the reactor(s). Furthermore, the high MTBE concentration in the recycle stream is capable of increasing the MTBE concentration in the MTBE synthesis reactor(s). The increased MTBE concentration can increase the affinity between MTBE and the resin catalyst and improve the diffusivity of a reaction mixture in the swelled resin in the MTBE synthesis reactor(s), resulting in increased catalyst efficiency and in turn, increased MTBE production efficiency. These and other non-limiting aspects of the present invention are discussed in further detail in the following sections.

A. System for Producing MTBE

Figure 1A:
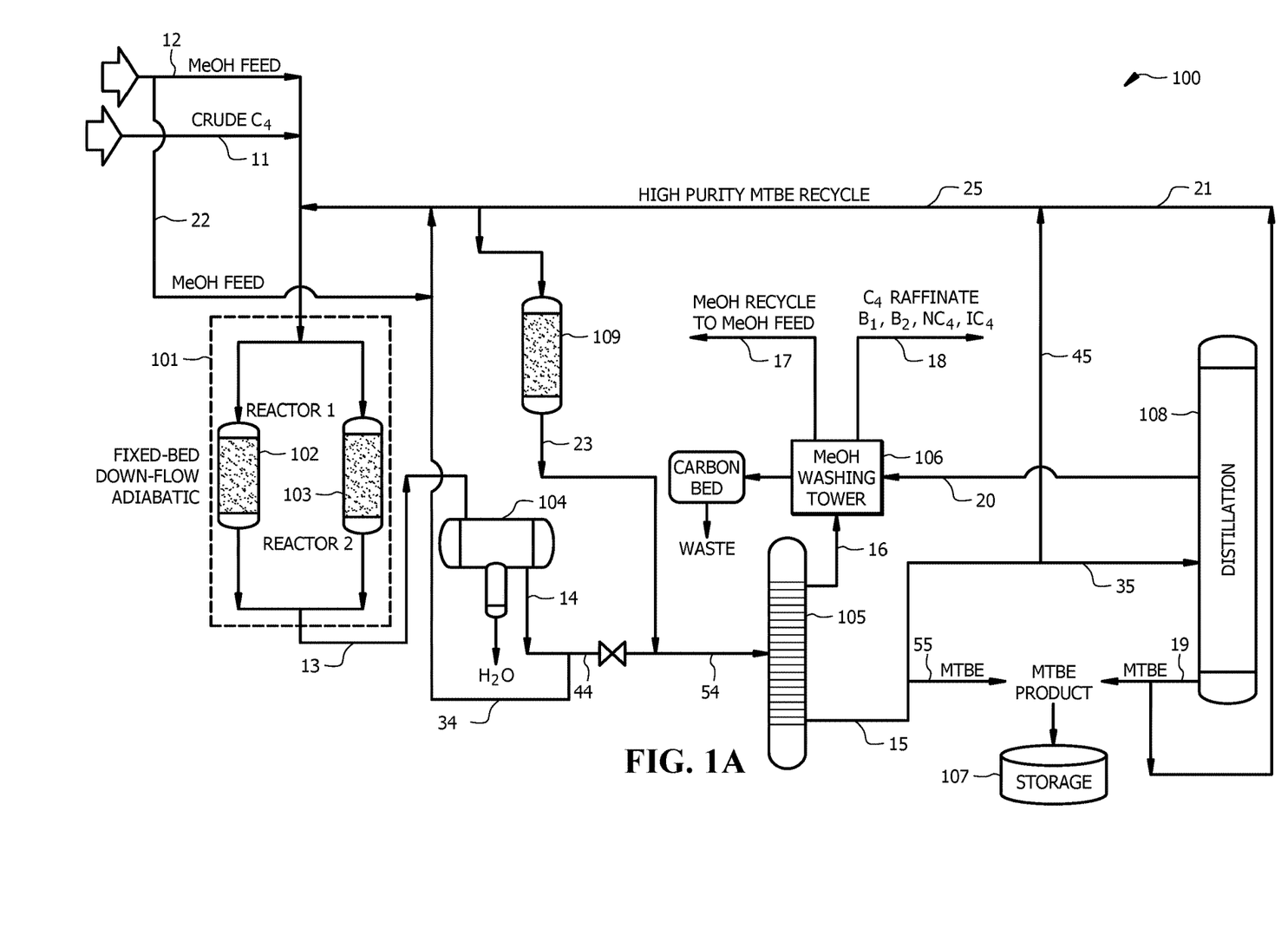
FIG. 1A shows a schematic diagram for a system for producing MTBE that does not include a reactive distillation column.

In embodiments of the invention, the system for producing MTBE can include a reactor unit, a first distillation column, and a second distillation column. With reference to FIG. 1A, a schematic diagram is shown of system 100 that is configured to produce MTBE with improved production efficiency and reduced production cost compared to conventional methods. According to embodiments of the invention, system 100 includes reactor unit 101.

According to embodiments of invention, reactor unit 101 is configured to receive (i) crude $C_4$ hydrocarbon stream 11 comprising isobutylene and (ii) methanol stream 12 comprising primarily methanol and then to react isobutylene from crude $C_4$ hydrocarbon stream 11 with methanol of methanol stream 12 to form reactor unit effluent 13 comprising MTBE. In embodiments of the invention, reactor unit 101 comprises first reactor 102 and second reactor 103.

In embodiments of the invention, crude $C_4$ hydrocarbon stream 11 is a $C_4$ stream from a cracking unit such as a steam cracking unit. Crude $C_4$ hydrocarbon stream 11 may further include n-butane, isobutane, 1-butene, 2-butene, butadiene, or combinations thereof. Reactor unit effluent 13 may further comprise n-butane, isobutane, 1-butene, 2-butene, butadiene, unreacted isobutylene, unreacted methanol, water, or combinations thereof. According to embodiments of the invention, first reactor 102 and second reactor 103 are arranged and operated in parallel. First reactor 102 and second reactor 103 may be fixed bed reactors. In embodiments of the invention, first reactor 102 and second reactor 103 are adiabatic fixed bed reactors such as fixed bed down-flow adiabatic reactors. Reactor unit effluent 13 may be a combined reactor effluent stream from first reactor 102 and second reactor 103.

In embodiments of the invention, first reactor 102 and second reactor 103 include a catalyst comprising a polystyrene based resin, polystyrene divinyl benzene based resin, sulfonic resin, macroreticular resin, acidic ion-exchange resin, sulphonated macroporous resin, or combinations thereof. Exemplary resins of the catalyst may include A-35 resin, A-15 resin, CT-175 resin, CT-275 resin, CSP2 resin, CSP3 resin, and D008 resin. In embodiments of the invention, the polystyrene based resin includes sulfonic functionalized macrocreticular resin. In embodiments of the invention, both first reactor 102 and second reactor 103 are down flow reactors. According to embodiments of the invention, an outlet of reactor unit 101 is in fluid communication with flash drum 104 such that reactor unit effluent 13 flows from reactor unit 101 to flash drum 104. In embodiments of the invention, flash drum 104 is configured to remove water from reactor unit effluent 13 to form dried reactor unit effluent 14. In embodiments of the invention, flash drum 104 may be replaced with any unit known in the art to perform the same function. In embodiments of the invention, an outlet of flash drum 104 may be in fluid communication with first distillation column 105 such that dried reactor unit effluent 14 flows from flash drum 104 to first distillation column 105.

In embodiments of the invention, first distillation column 105 is configured to separate dried reactor unit effluent 14 to produce first bottom stream 15 comprising primarily MTBE and first top stream 16 comprising primarily methanol, 1-butene, 2-butene, n-butane, and isobutane, collectively. First top stream 16 may comprise unreacted isobutylene. In embodiments of the invention, first bottom stream 15 further comprises unreacted isobutylene. First bottom stream 15 may comprise less than 0.5 wt. % isobutylene. According to embodiments of the invention, a top outlet of first distillation column 105 is in fluid communication with methanol washing tower 106 such that first top stream 16 flows from first distillation column 105 to methanol washing tower 106. In embodiments of the invention, methanol washing tower 106 is configured to separate first top stream 16 to form recovered methanol stream 17 comprising primarily methanol and $C_4$ raffinate stream 18 comprising primarily 1-butene, 2-butene, n-butane, and isobutane, collectively. Recovered methanol stream 17 may be recycled to reactor unit 101. In embodiments of the invention, methanol washing tower 106 can be replaced with any other unit capable of recovering methanol from first top stream 16. The methanol washing tower may use a washing medium comprising water. In embodiments of the invention, methanol washing tower 106 may be in fluid communication with a carbon bed, a molecular sieve unit, or a combination thereof. The carbon bed may be configured to remove moisture and oxygenates.

In embodiments of the invention, first bottom stream 15 is divided to form first product portion 55, distillation feed portion 35, and first recycle portion 45. According to embodiments of the invention, a bottom outlet of first distillation column 105 is in fluid communication with MTBE storage unit 107 such that first product portion 55 flows from first distillation column 105 to MTBE storage unit 107. According to embodiments of the invention, the bottom outlet of first distillation column 105 is in fluid communication with second distillation column 108 such that distillation feed portion 35 flows from first distillation column 105 to second distillation column 108.

In embodiments of the invention, second distillation column 108 includes a non-reactive distillation column. The non-reactive distillation column is configured to separate distillation feed portion 35 to form (i) MTBE product stream 19 comprising at least 98 wt. % MTBE and (ii) second top stream 20 comprising methanol, $C_4$ hydrocarbons, MTBE (traces), or combinations thereof. According to embodiments of the invention, an outlet of second distillation column 108 (the non-reactive distillation column) is in fluid communication with reactor unit 101. At least a portion of MTBE product stream 19 may form recycle stream 21. In embodiments of the invention, first recycle portion 45 of first bottom stream 15 may be combined with recycle stream 21 to form combined recycle stream 25. At least a portion of combined recycle stream 25 can be fed into reactor unit 101. According to embodiments of the invention, combined recycle stream 25 is a high purity MTBE stream and may include 98 wt. % MTBE, no more than 0.5 $C_4$ hydrocarbons, no more than 0.7 wt. % methanol, no more than 0.6 wt. % tert-butyl alcohol, no more than 0.6 wt. % di-isobutene, no more than 1 wt. % $C_5$ hydrocarbons.

According to embodiments of the invention, system 100 further comprises third reactor 109. Third reactor 109 may be an adiabatic fixed bed reactor. In embodiments of the invention, an inlet of third reactor 109 is in fluid communication with an outlet of flash drum 104 such that a first portion of dried reactor unit effluent 14 forms first dried portion 34 and flows from flash drum 104 to third reactor 109. In embodiments of the invention, third reactor 109 is configured to react (1) at least some of the isobutylene of first dried portion 34 with (2) methanol of second methanol feed stream 22 and/or first dried portion 34 to produce third reactor effluent stream 23. In embodiments of the invention, third reactor effluent stream 23 is combined with second dried portion 44 of dried reactor effluent 14 to form mixed feed stream 54. In embodiments of the invention, at least a portion of combined recycle stream 25 is flowed to third reactor 109.

Figure 1B:
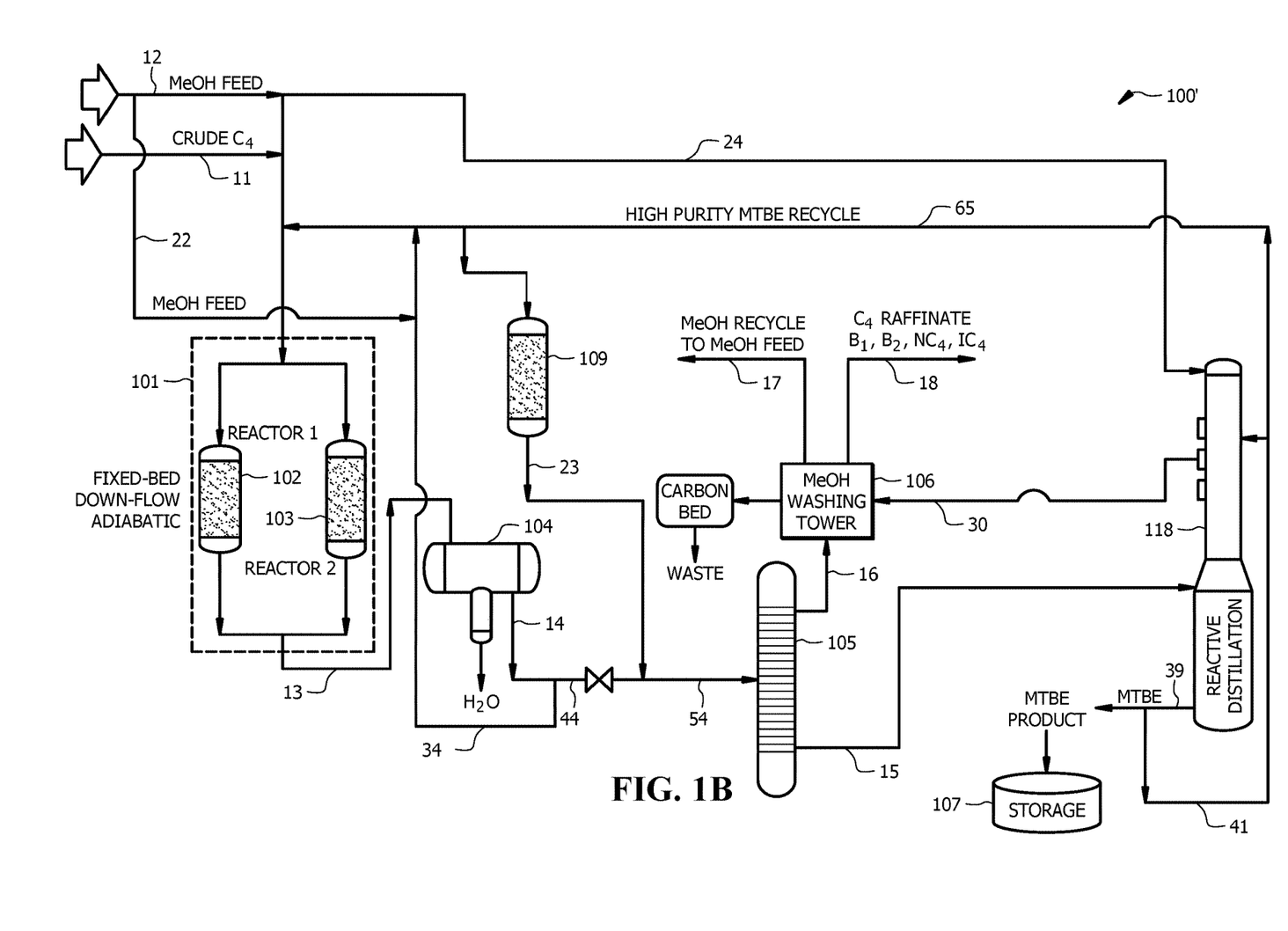
FIG. 1B shows a schematic diagram for a system for producing MTBE that includes a reactive distillation column.

Referring to FIG. 1B, system 100' may include all the elements of system 100 as shown in FIG. 1A, except that second distillation column 108 in system 100 is replaced with reactive distillation column 118 in system 100' of FIG. 1B. In embodiments of the invention, first bottom stream 15 may be flowed into reactive distillation column 118. Reactive distillation column 118 is configured to react isobutylene of first bottom stream 15 with methanol of (1) second methanol feed stream 24 and/or (2) first bottom stream 15 to produce additional MTBE. Reactive distillation column 118 is further configured to separate materials in the reactive distillation column to form (i) second MTBE product stream 39 comprising at least 98 wt. % MTBE and (ii) third top stream 30 comprising methanol, $C_4$ hydrocarbons, MTBE (traces), or combinations thereof. According to embodiments of the invention, reactive distillation column 118 includes a catalyst comprising polystyrene based resin, polystyrene divinyl benzene based resin, sulfonic resin, macroreticular resin, acidic ion-exchange resin, sulphonated macroporous resin, or combinations thereof. Reactive distillation column 118 may be operated at an overhead boiling temperature range of 25 to 40° C., a reboiler temperature range of 130 to 145° C., and an operating pressure of 4 to 8 bar. A portion of MTBE product stream 39 can form second recycle stream 41. In embodiments of the invention, at least a portion of second recycle stream 41 is flowed back to reactive distillation column 118, resulting in final recycle portion 65 of second recycle stream 41 flowing to reactor unit 101 and/or third reactor 109.

B. Method of Producing MTBE

Figure 2:
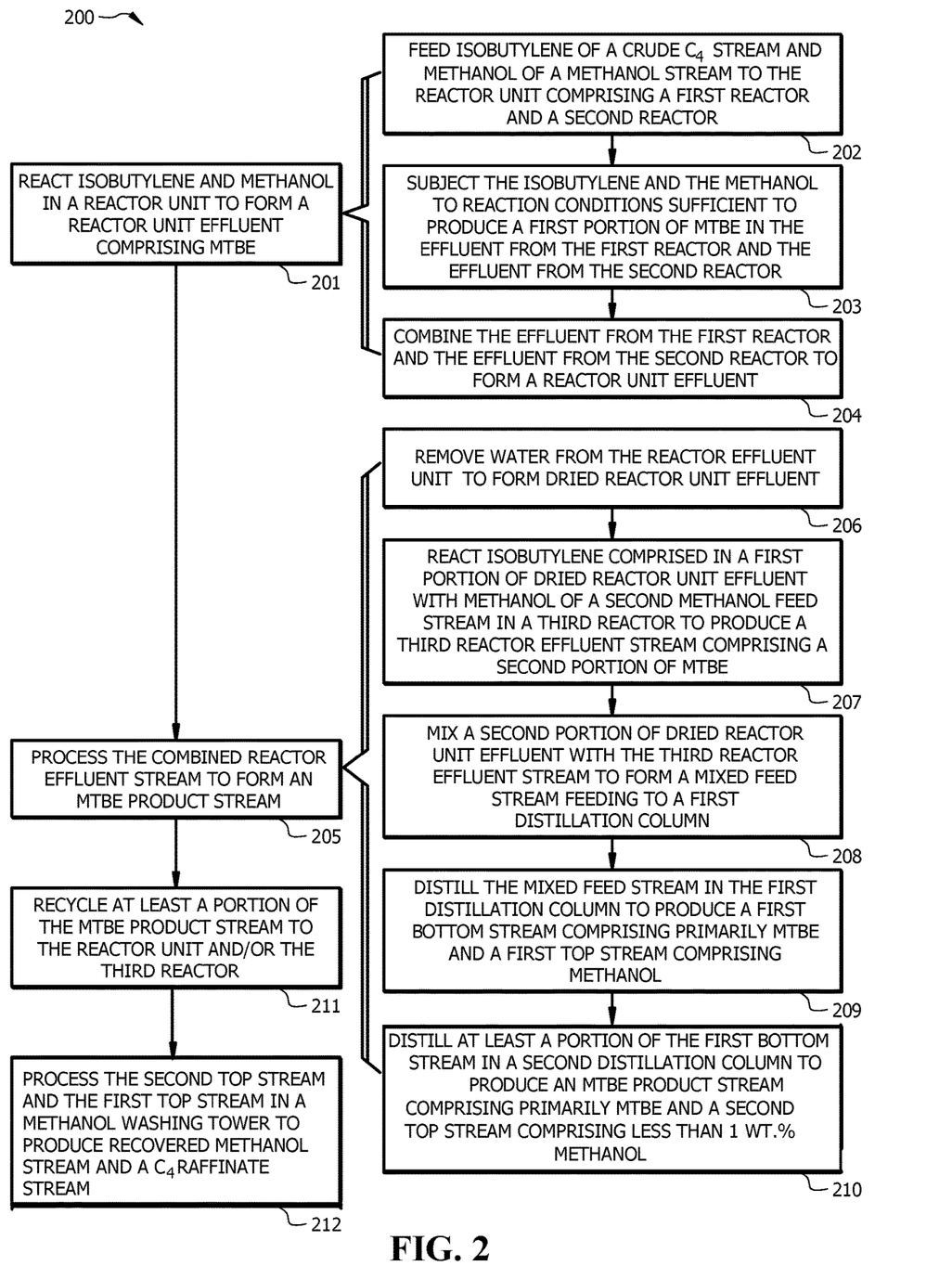
FIG. 2 shows a schematic flowchart for a method of producing MTBE, according to embodiments of the invention.

Methods of producing MTBE that include recycling a MTBE product stream to the reactor unit have been discovered. Embodiments of the methods are capable of increasing the MTBE production efficiency and reducing the capital and production expenditure compared to conventional methods for producing MTBE. As shown in FIG. 2, embodiments of the invention include method 200 for producing MTBE. Method 200 may be implemented by system 100 and/or system 100', as shown in FIGS. 1A and 1B, respectively.

According to embodiments of the invention, as shown in block 201, method 200 includes reacting isobutylene and methanol in reactor unit 101 to form reactor unit effluent 13 comprising MTBE. In embodiments of the invention, reactor unit effluent 13 comprises 20 to 65 wt. % MTBE, 1 to 3 wt. % isobutylene, and 0.5 to 2 wt. % methanol. In embodiments of the invention, as shown in block 202, reacting at block 201 includes feeding isobutylene of crude $C_4$ hydrocarbon stream 11 and methanol of methanol stream 12 to first reactor 102 and second reactor 103. In embodiments of the invention, crude $C_4$ hydrocarbon stream 11 includes 18 to 55 wt. % isobutylene and all ranges and values there between. In embodiments of the invention, at block 202, isobutylene content in crude $C_4$ hydrocarbon stream 11 and methanol stream 12 have a mole ratio in a range of 1 to 0.7 and all ranges and values there between.

According to embodiments of the invention, as shown in block 203, reacting at block 201 includes subjecting the isobutylene of crude $C_4$ hydrocarbon stream 11 and the methanol of methanol stream 12, in first reactor 102 and second reactor 103, respectively, to reaction conditions sufficient to cause the isobutylene to react with the methanol to produce a first portion of MTBE in effluent from first reactor 102 and in effluent from the second reactor 103. In embodiments of the invention, the reaction conditions at block 203 include a reaction temperature in a range of 50 to 65° C. and all ranges and values there between including ranges of 50 to 52° C., 52 to 54° C., 54 to 56° C., 56 to 58° C., 58 to 60° C., 60 to 62° C., 62 to 64° C., and 64 to 65° C. The reaction conditions at block 203 may further include reaction pressure above incipient boiling pressure corresponding to given reaction temperature range. In embodiments of the invention, the reaction conditions at block 203 further include weight hourly space velocity in a range of 0.5 to 2 $hr^{-1}$ and all ranges and values there between including ranges of 0.5 to 0.7 $hr^{-1}$, 0.7 to 0.9 $hr^{-1}$, 0.9 to 1.1 $hr^{-1}$, 1.1 to 1.3 $hr^{-1}$, 1.3 to 1.5 $hr^{-1}$, 1.5 to 1.7 $hr^{-1}$, 1.7 to 1.9 $hr^{-1}$, and 1.9 to 2.0 $hr^{-1}$. According to embodiments of the invention, as shown in block 204, reacting at block 201 further includes combining effluent from first reactor 102 and effluent from second reactor 103 to form a reactor unit effluent 13.

According to embodiments of the invention, as shown in block 205, method 200 further includes processing reactor unit effluent 13 to form MTBE product stream 19. In embodiments of the invention, MTBE product stream 19 comprises at least 90 wt. % MTBE, preferably 95 to 99 wt. % MTBE and all ranges and values there between including ranges of 95 to 96 wt. %, 96 to 97 wt. %, 97 to 98 wt. %, and 98 to 99 wt. %.

According to embodiments of the invention, as shown in block 206, processing at block 205 includes removing water, in flash drum 104, from reactor unit effluent 13 to form dried reactor unit effluent 14. In embodiments of the invention, dried reactor unit effluent 14 comprises less than 0.5 wt. % water. In embodiments of the invention, flash drum 104 includes one or more flash drums and each flash drum is operated at an operating temperature of 50 to 65° C. and an operating pressure corresponding to reactor exit conditions mentioned above.

According to embodiments of the invention, as shown in block 207, processing at block 205 includes reacting isobutylene comprised in first dried portion 34 of dried reactor unit effluent 14 with methanol of second methanol feed stream 22 in third reactor 109 to produce third reactor effluent stream 23 comprising a second portion of MTBE. In embodiments of the invention, reacting at block 207 is carried out at a reaction temperature in a range of 50 to 65° C. and all ranges and values there between including ranges of 50 to 52° C., 52 to 54° C., 54 to 56° C., 56 to 58° C., 58 to 60° C., 60 to 62° C., 62 to 64° C., and 64 to 65° C. Reacting at block 207 is carried out at a reaction pressure corresponding to above incipient boiling pressure corresponding to given reaction temperature range. Reacting at block 207 is carried out at a weight hourly space velocity of 0.5 to 2 $hr^{-1}$ and all ranges and values there between including ranges of 0.5 to 0.7 $hr^{-1}$, 0.7 to 0.9 $hr^{-1}$, 0.9 to 1.1 $hr^{-1}$, 1.1 to 1.3 $hr^{-1}$, 1.3 to 1.5 $hr^{-1}$, 1.5 to 1.7 $hr^{-1}$, 1.7 to 1.9 $hr^{-1}$, and 1.9 to 2.0 $hr^{-1}$. In embodiments of the invention, third reactor effluent stream 23 comprises 22 to 65 wt. % MTBE. Third reactor effluent stream 23 further comprises unreacted isobutylene, unreacted methanol, n-butane, isobutane, 1-butene, 2-butene, isobutene, butadiene, or combinations thereof.

In embodiments of the invention, as shown in block 208, processing at block 205 includes mixing second dried portion 44 of dried reactor unit effluent 14 with third reactor effluent stream 23 to form mixed feed stream 54 feeding to first distillation column 105. In embodiments of the invention, a flowrate ratio between third reactor effluent stream 23 and second dried portion 44 is in a range of 0.3 to 0.65 and all ranges and values there between including ranges of 0.3 to 0.35, 0.35 to 0.40, 0.40 to 0.45, 0.45 to 0.50, 0.50 to 0.55, 0.55 to 0.60, and 0.60 to 0.65. In embodiments of the invention, second dried portion 44 of dried combined reactor effluent stream 14 is about 35 to 70 vol. % of dried reactor unit effluent 14.

In embodiments of the invention, as shown in block 209, processing at block 205 includes distilling mixed feed stream 54 in first distillation column 105 to produce first bottom stream 15 comprising primarily MTBE and first top stream 16 comprising primarily methanol, 1-butene, 2-butene, n-butane, and isobutane, collectively. In embodiments of the invention, first distillation column 105 is operated at an overhead boiling range of 45 to 55° C. and a reboiler range of 90 to 140° C. In embodiments of the invention, first distillation column 105 is operated at an operating pressure of 5 to 8 bar and all ranges and values there between. In embodiments of the invention, first bottom stream 15 comprises 98 to 98.5 wt. % MTBE and all ranges and values there between. In embodiments of the invention, first bottom stream 15 further comprises methanol in a range of 0.1 to 0.7 wt. %.

According to embodiments of the invention, as shown in block 210, processing at block 205 further includes distilling at least some of first bottom stream 15 including distillation feed portion 35, in second distillation column 108, to produce MTBE product stream 19 comprising primarily MTBE. In embodiments of the invention, distilling at block 210 further produces second top stream 20 comprising less than 1 wt. % methanol. Second top stream 20 may further comprise $C_4$ hydrocarbons, and/or MTBE (traces). In embodiments of the invention, MTBE product stream 19 comprises at least 98 wt. % MTBE, preferably 98 to 99.5 wt. % MTBE and all ranges and values there between including ranges of 98 to 98.5 wt. %, 98.5 to 99 wt. %, and 99 to 99.5 wt. %. In embodiments of the invention, at block 210, second distillation column 108 is operated at an overhead boiling range of 45 to 55° C. and a reboiler range of 135 to 145° C. In embodiments of the invention, second distillation column 108 is operated at an operating pressure of about 8 bar. In embodiments of the invention, second distillation column 108 is replaced with reactive distillation column 118 and method 200 further comprises recycling at least some MTBE product stream 19 back to second distillation column and reacting unreacted isobutylene of MTBE product stream 19 with methanol of second methanol feed stream 24 to produce additional MTBE.

In embodiments of the invention, as shown in block 211, method 200 further includes recycling at least a portion of MTBE product stream 19, including recycle stream 21, to reactor unit 101. In embodiments of the invention, flowrate of recycle stream 21 is about 10 to 20% of the flowrate of MTBE product stream and all ranges and values there between including ranges of 10 to 12%, 12 to 14%, 14 to 16%, 16 to 18%, and 18 to 20%. According to embodiments of the invention, at least a portion of recycle stream 21 is flowed to third reactor 109. In embodiments of the invention, at least a portion, including first recycle portion 45 of first bottom stream 15 may be combined with recycle stream 21 to form combined recycle stream 25. Combined recycle stream 25 may be fed to reactor unit 101 and/or third reactor 109.

According to embodiments of the invention, at block 211, the recycling of recycle stream 21 or combined recycle stream 25 is capable of increasing isobutylene conversion rate and MTBE production efficiency compared to recycling a stream comprising lower MTBE concentration than the recycling stream 21 or combined recycle stream 25. In embodiments of the invention, the recycling of at least MTBE product stream 19 is adapted to cause structural change of the resin-based catalyst in first reactor 102, second reactor 103, and/or third reactor 109. In embodiments of the invention, the recycling of at least MTBE product stream 19 is adapted to be more effective in cooling first reactor 102, second reactor 103, and/or third reactor 109 as compared with conventional methods that do not include recycling MTBE into MTBE synthesis reactor(s). According to embodiments of the invention, recycling of at least product stream 19 is adapted to promote swelling effect of the resin based catalyst, resulting in increased access to an active site of the resin based catalyst and improved permeation through polymer backbone of the resin based catalyst. The recycling of at least product stream 19 may enable isobutylene and methanol to diffuse towards active sites of the resin based catalyst in the same direction, thereby increasing efficiency of MTBE synthesis.

In embodiments of the invention, as shown in block 212, method 200 may further still include processing second top stream 20 and first top stream 16 in methanol washing tower 106 to produce recovered methanol stream 17 comprising primarily methanol and $C_4$ raffinate stream 18 comprising 1-butene, 2-butene, n-butane, isobutane, or combinations thereof. According to embodiments of the invention, recovered methanol stream 17 may be recycled as methanol feed for first reactor 102, second reactor 103, third reactor 109, and/or second distillation column 108.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

The systems and processes described herein can also include various equipment that is not shown and is known to one of skill in the art of chemical processing. For example, some controllers, piping, computers, valves, pumps, heaters, thermocouples, pressure indicators, mixers, heat exchangers, and the like may not be shown.

As part of the disclosure of the present invention, a specific example is included below. The example is for illustrative purposes only and is not intended to limit the invention. Those of ordinary skill in the art will readily recognize parameters that can be changed or modified to yield essentially the same results.

EXAMPLE

Production of MTBE Using a MTBE Recycle Stream

Figure 3A:
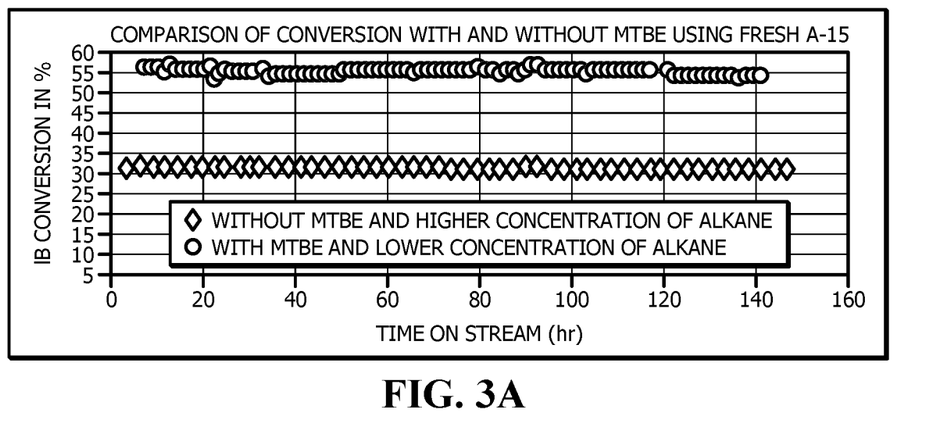
FIG. 3A shows results of isobutylene conversion rate for using both of the feed streams.
Figure 3B:
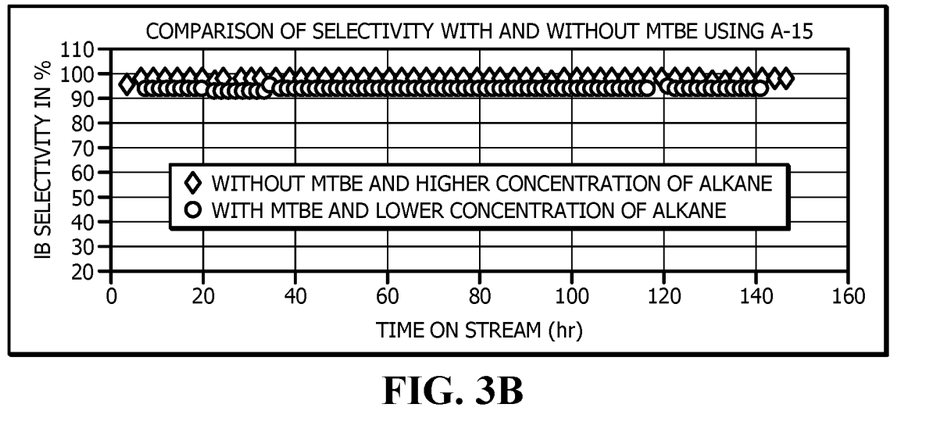
FIG. 3B shows results of selectivity of isobutylene to MTBE for using both of the feed streams.

Experiments at pilot scale system were carried out in a pilot scale MTBE production system to investigate the effects of MTBE concentration in the feed stream to the reactor unit on the conversion rate of isobutylene to MTBE. A MTBE production process that uses a feed stream containing no MTBE was used as the negative control. The compositions of the feed stream including MTBE and the feed stream including no MTBE are shown in Table 1A and Table 1B, respectively. The reaction conditions for producing MTBE using these feed streams are listed in Table 2. The conversion rates of isobutylene for using both of the feed streams were plotted against time-on-stream. The results are shown in FIGS. 3A and 3B.

TABLE 1A

Composition of feed stream containing no MTBE
Feed Composition More Alkane

| Feed composition | Wt % |
| --- | --- |
| N-butane | 2.61 |
| I-butane | 54.29 |
| T-2-butene | 2.70 |
| Methanol | 13.6 |
| Isobutylene | 21.44 |
| Cis-2-butene | 2.70 |
| 1,3.butadiene | 2.65 |

TABLE 1B

Composition of feed stream containing MTBE
Feed Composition MTBE & less alkanes

| Feed composition | Wt % |
| --- | --- |
| N-butane | 0.31 |
| I-butane | 19.74 |
| T-2-butene | 0.26 |
| Methanol | 12.58 |
| Isobutylene | 24.23 |
| Cis-2-butene | 0.24 |
| 1,3.butadiene | 0.22 |
| MTBE | 42.72 |

TABLE 2

Reaction conditions for producing MTBE

| Reaction Conditions | Values |
| --- | --- |
| Catalyst Quantity (g) | 0.50 |
| Temperature (deg C.) | 60.00 |
| WHSV (kg-feed per kg-catalyst hour) | 72.49 |
| HC2 flow (ml/hr) | 53.80 |
| MeOH flow (ml/min) | 0.10 |
| Isobutene to MeOH ratio | 0.04 |

The results of the isobutylene conversion rates for using both of the feed streams are shown in FIG. 3A and the results of the selectivity to MTBE from isobutylene are shown in FIG. 3B ("IB" in FIGS. 3A and 3B stands for "isobutylene"). The results indicate that the isobutylene conversion rate to MTBE increased from about 30% to about 55% when MTBE is added in the feed stream while the selectivity is effectively unchanged. The increase of the MTBE production efficiency was potentially due to the structural change of the resin catalyst and/or the cooling effect caused by feeding MTBE to the MTBE synthesis reactor.

In the context of the present invention, at least the following 15 embodiments are described. Embodiment 1 is a method of producing methyl tertiary butyl ether (MTBE). The method includes reacting isobutylene and methanol in a reactor unit to form a reactor unit effluent containing MTBE. The method further includes processing the reactor unit effluent to form an MTBE product stream containing at least 90 wt. % MTBE. The method still further includes recycling at least a portion of the MTBE product stream to the reactor unit. Embodiment 2 is the method of embodiment 1, wherein the recycling of at least a portion of MTBE product stream is capable of improving cooling efficiency in the reactor unit. Embodiment 3 is the method of either of embodiments 1 or 2, wherein the reactor unit includes a resin based catalyst, wherein the recycling of the at least a portion of MTBE product stream is capable of improving diffusivity of isobutylene and methanol in the resin based catalyst. Embodiment 4 is the method of embodiment 3, wherein the recycling of at least a portion of MTBE product stream is capable of improving access to active sites of the resin based catalyst for isobutylene and methanol. Embodiment 5 is the method of either of embodiments 3 or 4, wherein the resin based catalyst contains a polystyrene based resin, a polystyrene divinyl benzene based resin, a sulfonic resin, macroreticular resin, an acidic ion-exchange resin, a sulphonated macroporous resin, or combinations thereof. Embodiment 6 is the method of any of embodiments 1 to 5, wherein the processing includes removing water from the reactor unit effluent to form dried reactor unit effluent. The processing further includes distilling at least a portion of the dried reactor unit effluent in a first distillation column to produce a first bottom stream containing MTBE and a first top stream containing primarily methanol 1-butene, 2-butene, n-butane, and isobutane, collectively. The processing also includes distilling at least some of the first bottom stream in a second distillation column to produce an MTBE product stream containing at least 90 wt. % MTBE. Embodiment 7 is the method of embodiment 6, wherein the first top stream further contains less than 0.5 wt. % unreacted isobutylene. Embodiment 8 is the method of either of embodiments 6 or 7, further including processing the first top stream in a methanol washing column to recover at least some methanol. Embodiment 9 is the method of any of embodiments 6 to 8, wherein the second distillation column is a reactive distillation column. Embodiment 10 is the method of any of embodiments 6 to 9, wherein the reactor unit includes a first adiabatic fixed bed reactor and a second adiabatic fixed bed reactor. Embodiment 11 is the method of embodiment 10, wherein the first adiabatic fixed bed reactor and the second adiabatic fixed bed reactor are arranged in parallel. Embodiment 12 is the method of either of embodiments 10 or 11, wherein the reacting step includes feeding isobutylene and methanol to the first adiabatic fixed bed reactor and the second adiabatic fixed bed reactor. The reacting step further includes subjecting the isobutylene and the methanol, in the first adiabatic fixed bed reactor and the second adiabatic fixed bed reactor, respectively, to reaction conditions sufficient to cause the isobutylene to react with the methanol to produce a first portion of MTBE in a reactor unit effluent. Embodiment 13 is the method of either of embodiments 11 or 12, wherein the reactor unit effluent includes an effluent stream from first adiabatic fixed bed reactor and an effluent stream from the second adiabatic fixed bed reactor, and wherein the reactor unit effluent further contains isobutylene. Embodiment 14 is the method of embodiment 13, wherein the processing step further includes reacting isobutylene contained in a first portion of the dried reactor unit effluent with methanol in a third adiabatic fixed bed reactor that is in series with the first adiabatic fixed bed reactor and the second adiabatic fixed bed reactor, to produce a third adiabatic fixed bed reactor effluent stream containing a second portion of MTBE. The processing step further includes mixing a second portion of the dried reactor unit effluent with the third adiabatic fixed bed reactor effluent stream to form a mixed feed stream for a first distillation column. The processing step still further includes distilling the mixed feed stream in the first distillation column to produce a first bottom stream containing primarily MTBE and a first top stream containing primarily methanol, 1-butene, 2-butene, n-butane, and isobutane, collectively. The processing step also includes distilling at least some of the first bottom stream, in a second distillation column, to produce an MTBE product stream containing at least 90 wt. % MTBE. Embodiment 15 is the method of embodiment 14, further including recycling a third portion of the reactor unit effluent to the first adiabatic fixed bed reactor and/or the second adiabatic fixed bed reactor.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of producing methyl tertiary butyl ether (MTBE), the method comprising:
   reacting isobutylene and methanol in a reactor unit to form a reactor unit effluent comprising MTBE;
   processing the reactor unit effluent to form an MTBE product stream comprising at least 90 wt. % MTBE; and
   recycling at least a portion of the MTBE product stream comprising at least 90 wt. % MTBE to the reactor unit, wherein the processing comprises:
   removing water from the reactor unit effluent to form dried reactor unit effluent;
   distilling at least a portion of the dried reactor unit effluent in a first distillation column to produce a first bottom stream comprising MTBE and a first top stream comprising primarily methanol 1-butene, 2-butene, n-butane, and isobutane, collectively; and
   distilling at least some of the first bottom stream in a second distillation column to produce the MTBE product stream comprising at least 90 wt. % MTBE.

2. The method of claim 1, wherein the recycling of at least a portion of MTBE product stream is capable of improving cooling efficiency in the reactor unit.

3. The method of claim 2, wherein the reactor unit comprises a resin based catalyst, wherein the recycling of the at least a portion of MTBE product stream is capable of improving diffusivity of isobutylene and methanol in the resin based catalyst.

4. The method of claim 1, wherein the reactor unit comprises a resin based catalyst, wherein the recycling of the at least a portion of MTBE product stream is capable of improving diffusivity of isobutylene and methanol in the resin based catalyst.

5. The method of claim 4, wherein the recycling of at least a portion of MTBE product stream is capable of improving access to active sites of the resin based catalyst for isobutylene and methanol.

6. The method of claim 5, wherein the reactor unit comprises a resin based catalyst, wherein the recycling of the at least a portion of MTBE product stream is capable of improving diffusivity of isobutylene and methanol in the resin based catalyst.

7. The method of claim 4, wherein the resin based catalyst comprises a polystyrene based resin, a polystyrene divinyl benzene based resin, a sulfonic resin, macroreticular resin, an acidic ion-exchange resin, a sulphonated macroporous resin, or combinations thereof.

8. The method of claim 7, wherein the reactor unit comprises a resin based catalyst, wherein the recycling of the at least a portion of MTBE product stream is capable of improving diffusivity of isobutylene and methanol in the resin based catalyst.

9. The method of claim 4, wherein the reactor unit comprises a resin based catalyst, wherein the recycling of the at least a portion of MTBE product stream is capable of improving diffusivity of isobutylene and methanol in the resin based catalyst.

10. The method of claim 1, wherein the first top stream further comprises less than 0.5 wt. % unreacted isobutylene.

11. The method of claim 1, further comprising processing the first top stream in a methanol washing column to recover at least some methanol.

12. The method of claim 1, wherein the second distillation column is a reactive distillation column.

13. The method of claim 1, wherein the reactor unit comprises a first adiabatic fixed bed reactor and a second adiabatic fixed bed reactor.

14. The method of claim 13, wherein the first adiabatic fixed bed reactor and the second adiabatic fixed bed reactor are arranged in parallel.

15. The method of claim 13, wherein the reacting step comprises:
feeding isobutylene and methanol to the first adiabatic fixed bed reactor and the second adiabatic fixed bed reactor; and
subjecting the isobutylene and the methanol, in the first adiabatic fixed bed reactor and the second adiabatic fixed bed reactor, respectively, to reaction conditions sufficient to cause the isobutylene to react with the methanol to produce a first portion of MTBE in a reactor unit effluent.

16. The method of claim 14, wherein the reactor unit effluent comprises an effluent stream from first adiabatic fixed bed reactor and an effluent stream from the second adiabatic fixed bed reactor, and wherein the reactor unit effluent further comprises isobutylene.

17. The method of claim 16, wherein the processing step further comprises:
reacting isobutylene comprised in a first portion of the dried reactor unit effluent with methanol in a third adiabatic fixed bed reactor that is in series with the first adiabatic fixed bed reactor and the second adiabatic fixed bed reactor, to produce a third adiabatic fixed bed reactor effluent stream comprising a second portion of MTBE;
mixing a second portion of the dried reactor unit effluent with the third adiabatic fixed bed reactor effluent stream to form a mixed feed stream for a first distillation column;
distilling the mixed feed stream in the first distillation column to produce a first bottom stream comprising primarily MTBE and a first top stream comprising primarily methanol, 1-butene, 2-butene, n-butane, and isobutane, collectively; and
distilling at least some of the first bottom stream, in a second distillation column, to produce an MTBE product stream comprising at least 90 wt. % MTBE.

18. The method of claim 17, further comprising:
recycling a third portion of the reactor unit effluent to the first adiabatic fixed bed reactor and/or the second adiabatic fixed bed reactor.

19. The method of claim 13, wherein the reacting step comprises:
feeding isobutylene and methanol to the first adiabatic fixed bed reactor and the second adiabatic fixed bed reactor.

* * * * *